United States Patent
Loos et al.

[11] Patent Number: 6,024,495
[45] Date of Patent: Feb. 15, 2000

[54] AXIAL SLIDING BEARING

[75] Inventors: Markus Loos, Baden; Jean-Yves Werro, Spreitenbach; Raimund Wohlrab, Baden., all of Switzerland

[73] Assignee: Asea Brown Boveri AG, Baden, Switzerland

[21] Appl. No.: 08/933,042

[22] Filed: Sep. 18, 1997

[30] Foreign Application Priority Data

Oct. 11, 1996 [DE] Germany .......................... 196 41 673

[51] Int. Cl.[7] ................................. F16C 17/04
[52] U.S. Cl. ................ 384/123; 384/124; 384/305
[58] Field of Search .................. 384/123, 305, 384/112, 124, 121

[56] References Cited

U.S. PATENT DOCUMENTS

| | | |
|---|---|---|
| 1,786,565 | 12/1930 | Freeman . |
| 5,724,213 | 3/1998 | Kim .......................................... 384/108 |
| 5,801,464 | 1/1998 | Brezoczky ............................... 384/108 |

FOREIGN PATENT DOCUMENTS

| | | |
|---|---|---|
| 49087 | 7/1966 | Germany . |
| 7819938 | 12/1979 | Germany . |
| 3244893A1 | 6/1983 | Germany . |
| 3244893C2 | 8/1985 | Germany . |
| 4311117A1 | 10/1994 | Germany . |
| 4330380A1 | 3/1995 | Germany . |
| 44116171A1 | 10/1995 | Germany . |

*Primary Examiner*—Lenard A. Footland
*Attorney, Agent, or Firm*—Burns, Doane, Swecker & Mathis, L.L.P.

[57] ABSTRACT

The object of the invention is to provide a simple and cost-effective solution for reducing the wear and consequently for increasing the life of axial sliding bearings. For this purpose, the profiled annular surface (24, 24') of the lubricating gap (25, 25') arranged between the fixed bearing body (20) and the rotating bearing collar (19) is designed to rotate about or with the shaft (14). Said annular surface has a plurality of radially arranged lubricating oil grooves (26, 26') and, in each case, a wedge surface (27, 27') connected to these in the circumferential direction. A catch surface (28, 28') is designed between each wedge surface (27, 27') and the lubricating oil groove (26, 26') adjacent to the latter. The lubricating oil grooves (26, 26') and the wedge surfaces (27, 27') are delimited radially outward by a sealing web (29, 29'). The sealing web (29, 29') has, in the region of the lubricating oil grooves (26, 26'), dirt grooves (30, 30') which are open to these and which are likewise designed to be open in the direction of the bearing housing (17). Larger dirt particles contained in the coarsely purified lubricating oil (3) are consequently centrifuged out before they reach the lubricating gap (25, 25').

9 Claims, 4 Drawing Sheets

AXIAL SLIDING BEARING

BACKGROUND OF THE INVENTION

1. Field of the Invention

The invention relates to an axial sliding bearing and to a method for operating it.

2. Discussion of Background

Hydrodynamic sliding bearings are often used for the mounting of turbochargers. Fixed segment bearings are normally employed as axial sliding bearings. These are composed of a bearing body connected fixedly to the bearing housing and having a profiled annular surface and of a plane sliding surface of the so-called bearing collar, said sliding surface rotating with the shaft. The profiled side has a plurality of radial lubricating grooves and corresponding wedge and catch lopping surfaces (see DE-A1 32 44 893). Said side may likewise be arranged on the bearing collar.

When the turbocharger is in operation, a loadbearing hydrodynamic lubricating film builds up between the plane surface and profiled surface on account of the shearing flow of the lubricating oil. The lubricating film thickness depends, inter alia, on the bearing load and, in the case of high pressure conditions, may, at about 20 µm, be very small.

As a rule, the lubrication of such an axial sliding bearing is carried out by the lubricating system of the internal combustion engine connected to the turbocharger. In this case, its relatively large lubricating oil stream is filtered only coarsely, that is to say with a mesh width of about 35 to 50 µm. However, because of its high rotational speeds and the narrow lubricating gaps, the turbocharger requires lubricating oil of finer consistency. Separate filtration for the turbocharger is usually impossible or too complicated and therefore relatively expensive (see DE-A1 44 11 617).

Under high pressure conditions, the minimum lubricating film thickness may, particularly on the axial sliding bearing, be smaller than the largest dirt particles which pass through the engine filter. This may give rise to premature wear of the bearing surfaces, especially of the wedge surfaces. However, if the necessary wedge surface of the bearing falls below its minimum value, the latter is no longer operationally reliable. In this case, an early failure of the bearing must be expected. The axial sliding bearing of turbochargers is therefore a component with a high risk of wear.

DD 49,087 discloses an axial sliding bearing for turbomachines, which is composed of a bearing body connected fixedly to a bearing housing, of a bearing collar rotating with the shaft and of a lubricating gap formed between the two. The lubricating gap is formed between a profiled annular surface rotating about the shaft and a plane fixed sliding surface. The annular surface has a plurality of radially arranged lubricating oil grooves and, in each case, a wedge surface connected to these in the circumferential direction, the lubricating oil grooves and the wedge surfaces being arranged alternately to one another on the annular surface. The lubricating oil grooves are in each case delimited relative to the outside by a sealing web. Each sealing web possesses a scavenging orifice passing through it and leading radially outward.

However, when a turbomachine mounted in this way is in operation, a substantial part of the lubricating oil may flow off outward over the edge of the profiled annular surface, that is to say, more precisely, over the wedge surfaces. The pressure buildup in the lubricating gap is thereby reduced, so that the latter becomes smaller. This leads to increased abrasion by dirt particles and consequently to a reduction in the life of the bearing.

DE-U1 78 19 938 discloses an axial sliding bearing for exhaust gas turbochargers, in which a floating disk arranged between the fixed bearing body and the rotating bearing collar is guided on the turbocharger shaft. The floating disk has a multisurface geometry with spiral oil grooves which are arranged on both sides and which extend as far as a region of contact with the bearing body or the bearing collar. With the aid of these grooves, a lubricating film is built up in each case between the bearing body and the floating disk, on the one hand, and between the floating disk and the bearing collar, on the other hand.

In such a solution with a floating disk, both the power loss of the turbocharger is reduced and, on account of the double lubricating gap, the skew compensation capacity of its thrust bearing is increased. In addition, the relative speed due to the disk rotation is reduced to about half the rotational speed of the rotor and consequently the wear behavior of the thrust bearing is markedly improved. However, in the case of such a floating disk, the minimum lubricating film thickness may likewise be smaller than the largest dirt particles of the lubricating oil, so that, even when said floating disk is used, the disadvantages described above cannot be eliminated.

SUMMARY OF THE INVENTION

The invention attempts to avoid all these disadvantages. It is based on the object of providing a simple and cost-effective axial sliding bearing with reduced wear and improved life. Moreover, a method for operating it is to be specified.

This is achieved, according to the invention, in that, in a device according to the preamble of claim 1, the profiled annular surface of the lubricating gap, said annular surface being required for building up pressure in the lubricating film, is designed to rotate about or with the shaft. Said annular surface has a plurality of radially arranged lubricating oil grooves and, in each case, a wedge surface adjoining these in the circumferential direction. A catch surface is formed between each wedge surface and the lubricating oil groove adjacent to the latter. The lubricating oil grooves and the wedge surfaces are delimited radially outward by a sealing web. The sealing web is equipped, in the region of the lubricating oil grooves, with dirt grooves open to these and likewise open radially outward.

By virtue of this design, the lubricating oil grooves and, with them, the dirt grooves arranged radially on the outside rotate, so that the larger dirt particles contained in the coarsely purified lubricating oil are centrifuged out before they reach the lubricating gap, more precisely in the region of the lubricating oil grooves. At the same time, separation is achieved on account of the centrifugal force which acts on the mixture of lubricating oil and dirt particles in the radial lubricating oil grooves. Due to the greater density of the dirt particles, these are forced outward and, together with the lubricating oil stream, thrown off outward through the dirt grooves. The dirt grooves thus act, as it were, as a bypass for the lubricating gap which is at its narrowest between the catch surfaces of the profiled annular surface and the plane sliding surface of the bearing body.

Moreover, the sealing web, which delimits relative to the outside not only the lubricating oil grooves, but also the wedge surfaces, ensures that less lubricating oil can flow off radially outward in the region of the wedge surfaces. The pressure buildup is therefore improved, thus leading to a larger lubricating gap, to reduced abrasion and ultimately to a longer service life of the bearing. This effect is further reinforced by the arrangement of the catch surfaces which improve the pressure buildup between the plane sliding surface of the bearing body and the profiled annular surface of the bearing collar. As a result of the combination of a bearing geometry having maximum load bearing force with a centrifuging out of coarse dirt particles through the dirt grooves, the bearing wear can be minimized to such an extent that the requirements placed on the service life of modern exhaust gas turbocharger components are satisfied.

In a first embodiment of the invention, the profiled annular surface is arranged on the bearing collar and the plane sliding surface is arranged on the bearing body. Accordingly, the lubricating oil in the lubricating oil grooves rotates with the shaft and the dirt particles are centrifuged out by way of the dirt grooves. Since the wear of the wedge surfaces of the lubricating gap is thus reduced, the service life of a collar-type bearing may advantageously be increased.

In a second embodiment of the invention, a floating disk is arranged between the bearing collar and the bearing body. Said floating disk has a profiled annular surface on both sides. Both the bearing collar and the bearing body are designed with a plane sliding surface. In this case, the lubricating oil in the two lubricating oil grooves of the floating disk rotates about the shaft and the dirt particles are likewise centrifuged out by way of the dirt grooves. A combination of this floating disk known per se with the dirt grooves improves the wear behavior of the bearing in a sustained manner.

Especially advantageously, each wedge surface has a entry wedge depth and each dirt groove has a depth, the latter corresponding to 0.5 to 3 times the entry wedge depth. In his range of magnitude, the dirt grooves are dimensioned in such a way that, on the one hand, the coarse dirt particles can easily pass through the orifice of the corresponding dirt groove and, on the other hand, the lubricating oil stream through these dirt grooves does not become too large.

The filter arranged in the lubricating oil circuit of the internal combustion engine has a mesh width, with the aid of which the lubricating oil is coarsely filtered according to the demand of the internal combustion engine. The depth of each dirt groove corresponds at least to twice this mesh width of the filter. Such a depth advantageously prevents clogging of the dirt grooves.

It is particularly expedient if the depth of each dirt groove is designed to be smaller than twice the entry wedge depth of the corresponding wedge surface. The oil quantity or the oil consumption required for discharging the dirt particles can consequently be reduced.

In both embodiments, an optimum loadbearing force of the axial sliding bearing is achieved when the extent of the catch surfaces amounts to approximately ¼ of the extent of the entire wedge surfaces of the bearing.

A BRIEF DESCRIPTION OF THE DRAWINGS

A more complete appreciation of the invention and many of the attendant advantages thereof will be readily obtained as the same becomes better understood by reference to the following detailed description, when considered in connection with the accompanied drawings, wherein.

Only the elements essential for understanding the invention are shown. Of the plant, for example the path of the exhaust gas from the internal combustion engine to the exhaust gas turbocharger, including the charging of the internal combustion engine, is not illustrated. The direction of flow of the lubricating oil and the direction of rotation of the profiled annular surface are designated by arrows.

DESCRIPTION OF THE PREFERRED EMBODIMENT

Figure 1:
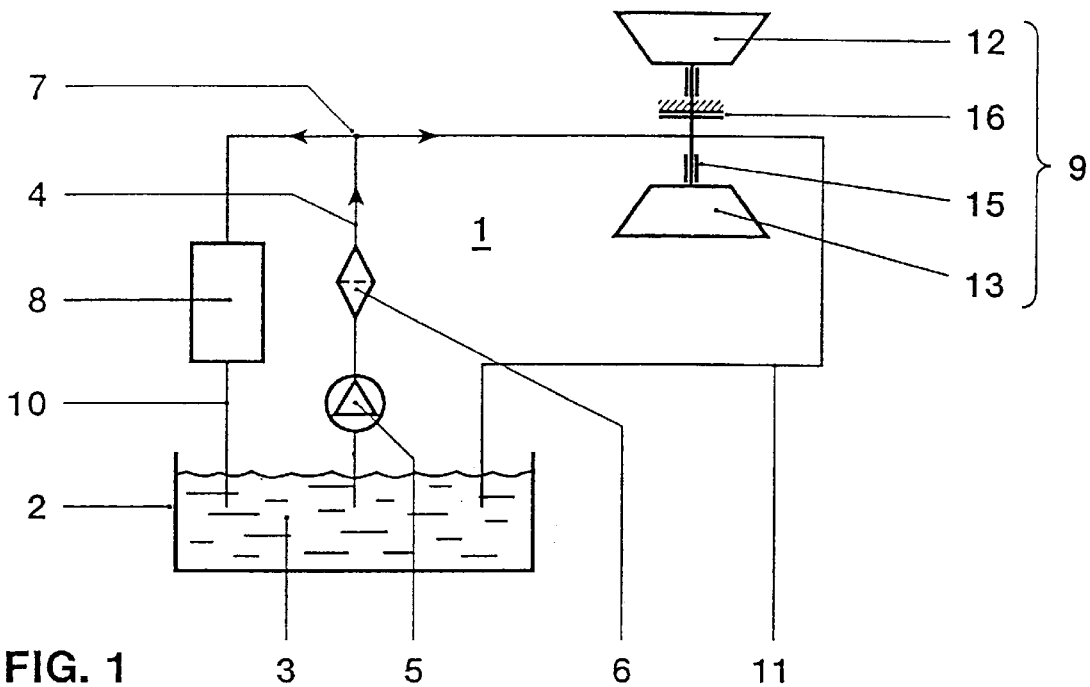
FIG. 1 shows a diagrammatic illustration of the common lubricating oil circuit of the internal combustion engine and the exhaust gas turbocharger.

Referring now to the drawings, wherein like reference numerals designate identical or corresponding parts throughout the several views, the lubricating oil circuit 1 is composed of an oil sump 2, of an oil pump delivering lubricating oil 3 from the oil sump 2 into an oil conduit 4, of a filter 6, of a branch 7 of the oil conduit 4 to an internal combustion engine 8, designed as a diesel engine, or to an exhaust gas turbocharger 9 and, in each case, of a return conduit 10, 11 to the oil sump 2. The exhaust gas turbocharger 9, illustrated only diagrammatically, possesses a compressor side 12 and a turbine side 13 which are connected to one another via a shaft 14. A radial sliding bearing 15 is in each case arranged both on the compressor side and on the turbine side for the mounting of the shaft 14. An axial sliding bearing 16 is designed between the radial sliding bearings 15 for the purpose of absorbing the axial forces of the exhaust gas turbocharger 9 (FIG. 1).

The axial sliding bearing 16 is composed of a bearing housing 17 and of a rotating bearing collar 19 which is connected fixedly to a bearing journal 18 of the shaft 14 and which cooperates with a fixed bearing body 20. Arranged in the bearing body 20 is an oil feed 21 which is designed as a radial oil duct and which is connected at its outer end to the common lubricating oil circuit 1 of the internal combustion engine 8 and of the exhaust gas turbo charger 9. The radial oil duct 21 has an annular duct 22 at its inner end (FIG. 2).

Figure 2:
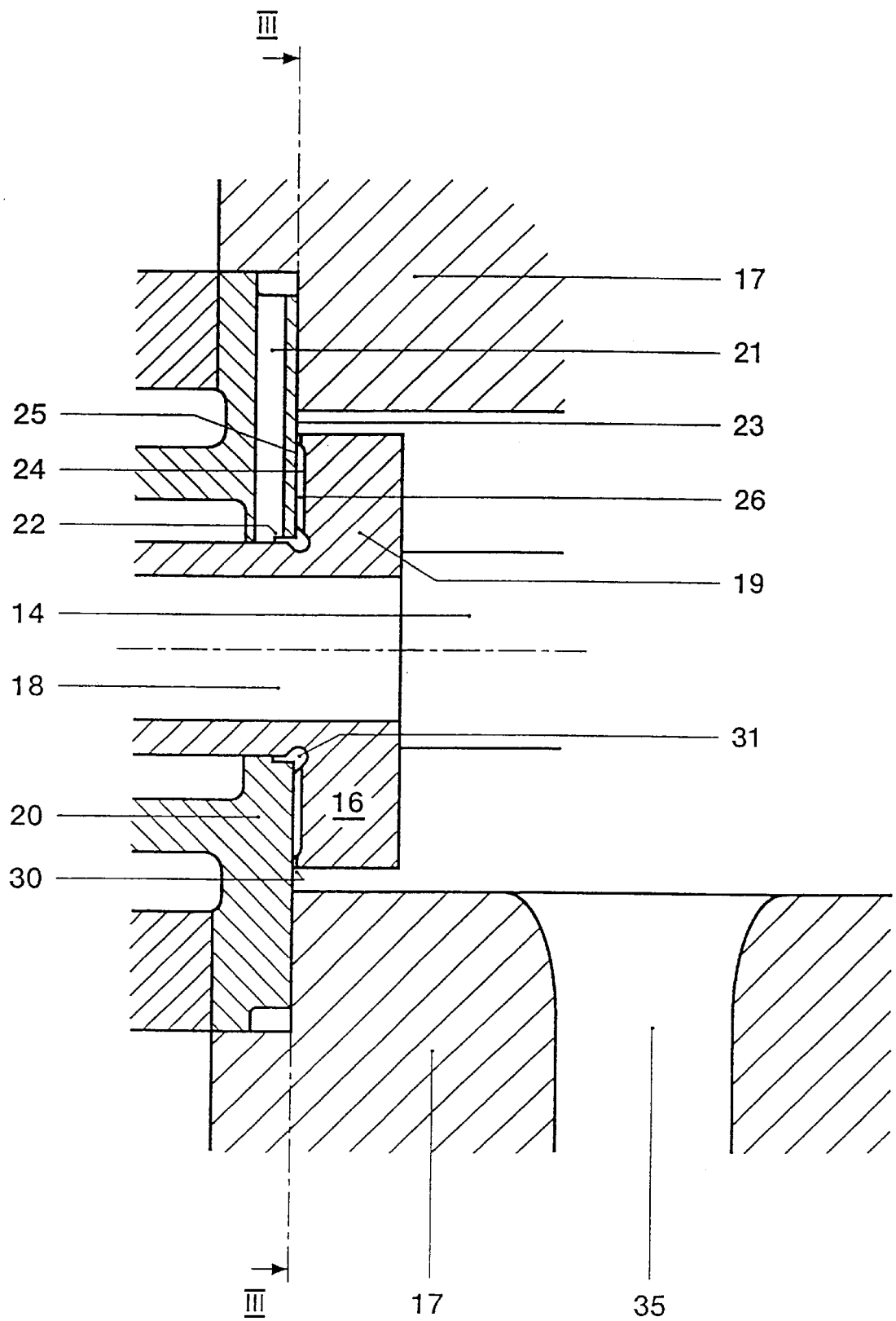
FIG. 2 shows a part longitudinal section through the exhaust gas turbocharger in the region of its axial sliding bearing.
Figure 3:
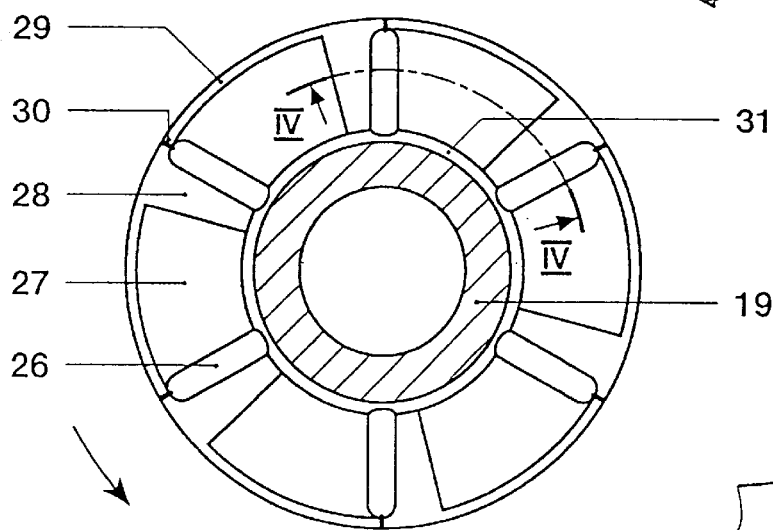
FIG. 3 shows a view of the profiled annular surface of the bearing collar along the line III—III in FIG. 2.

The bearing body 20 possesses a plane sliding surface 23 on its side facing the bearing collar 19, whilst that side of the bearing collar 19 which faces the bearing body 20 is equipped with a profiled annular surface 24 (FIG. 2, FIG. 3). A lubricating gap 25 determining the loadbearing capacity of the axial sliding bearing 16 is formed between the profiled annular surface 24 and the plane sliding surface 23.

The profiled annular surface 24 is composed of a plurality of wedge surfaces 27 which in each case adjoin a radial lubricating oil groove 26 in the circumferential direction. A plane catch surface 28 is arranged in each case in the region between each wedge surface 27 and the lubricating oil groove 26 adjacent to the latter. Both the lubricating oil grooves 26 and the wedge surfaces 27 are delimited radially outward by a sealing web 29. The latter has, in the region of the lubricating oil grooves 26, radially oriented dirt grooves 30 which are open to these. The dirt grooves 30 are likewise designed to be open radially outward, that is to say in the direction of the bearing housing 17 (FIG. 3 to FIG. 6). An annular groove 31 is designed on the bearing collar 19, more precisely at the base of its profiled annular surface 24, said annular groove connecting the lubricating oils grooves 26 to one another and to the annular duct 22 of the bearing body.

Figure 6:
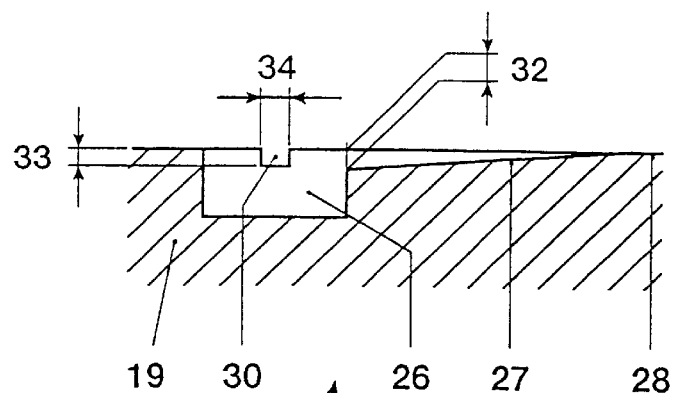
FIG. 6 shows an enlarged detail from FIG. 4 in the region of the dirt groove.
Figure 4:
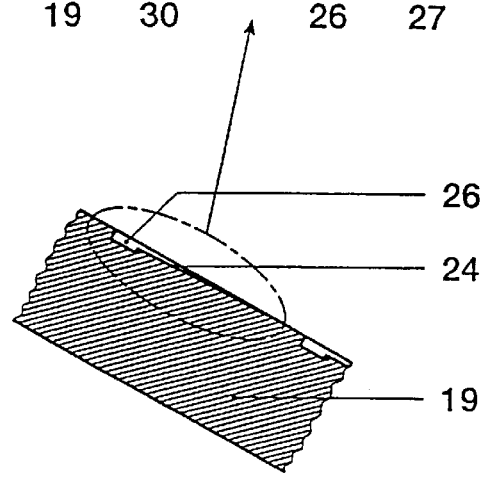
FIG. 4 shows a section through the bearing collar along the line IV—IV in FIG. 3.

The lubricating gap 25 is designed at its narrowest between the catch surfaces 28 of the profiled annular surface 24 and the plane sliding surface 23 of the bearing body 20. The wedge surfaces 27 have an entry wedge depth 32 and the dirt grooves 30 have a depth 33, the latter being 1.5 times the entry wedge depth 32 (FIG. 6). The filter 6, shown only diagrammatically in FIG. 1, has a mesh width, which is not illustrated, with respect to which the depth 33 of the dirt grooves 30 is about 3 times as large. In this case, the dirt grooves 30 have a groove width 34 which is larger than their depth 33 approximately by the amount of the width of the lubricating gap 25. The groove width 34 of the dirt grooves 30 has been oversized in relation to the other components solely for the purpose of illustrating the dirt grooves 30 in FIG. 2.

When the diesel engine 8 is in operation, the lubricating oil 3 required is conveyed out of the oil sump 2 by means of the oil pump 5 and is coarsely purified in the filter 6. The lubricating oil 3 passes from there, by way of a branch 7 in the oil conduit 4, to the bearing points, not illustrated, of the diesel engine 8 and to the two radial sliding bearings 15 and the axial sliding bearing 16 of the exhaust gas turbocharger 9 (FIG. 1).

Figure 5:
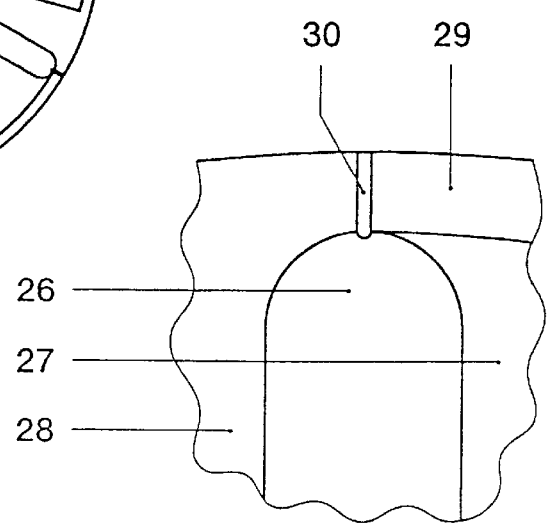
FIG. 5 shows an enlarged detail from FIG. 3 in the region of the connection of a lubricating oil groove and a dirt groove.

In the axial sliding bearing 16, the lubricating oil 3 is conveyed through the radial oil duct 21 of the fixed bearing body 20, its annular duct 22 and the annular groove 31 of the bearing collar 19 to the lubricating oil grooves 26 (FIG. 2). Since the lubricating oil grooves 26 are thus acted upon permanently from the lubricating oil circuit 1 and on account of the rotation of the profiled annular surface 24 of the bearing collar 19 and of the sealing web 29 arranged on the outside, the lubricating oil 3, starting from the lubricating oil grooves 26, passes in each case via the wedge surfaces 27 into the narrowing lubricating gap 25 (FIG. 3). From there, it is drawn by the shearing flow in the direction of the catch surfaces 28 and is for the most part pressed out laterally beyond the sealing web 29, the narrowest lubricating gap 25 being formed between the sealing gap and the plane sliding surface 23 of the bearing body 20. The sealing web 29 narrows the flow cross section for the lubricating oil 3 pressed radially outward, with the result that the pressure in the lubricating gap 25 is increased and the lubricating oil consumption of the axial sliding bearing 16 is reduced. The lubricating oil 3 rotating with the shaft 14 in the radial lubricating oil grooves 26 is simultaneously separated by the effect of centrifugal force. In this case, because of the greater density of the dirt particles, these are forced outward and, together with a part stream of the lubricating oil 3, are thrown off outward through the dirt grooves 30 (FIG. 5).

Finally, both the main stream guided through the lubricating gap 25 and the part stream of the lubricating oil 3, including the dirt particles, said part stream being guided through the dirt grooves 30, flow off through an oil outlet 35 designed in the bearing housing 17 and are discharged by way of the returned conduit 11 into the oil sump 2 of the diesel engine 8 (FIG. 1, FIG. 2).

Figure 9:
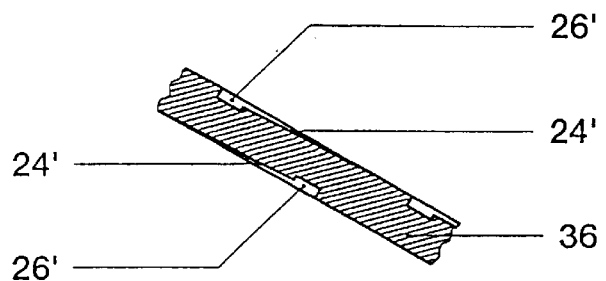
FIG. 9 shows a section through the floating disk along the line IX—IX in FIG. 8.
Figure 8:
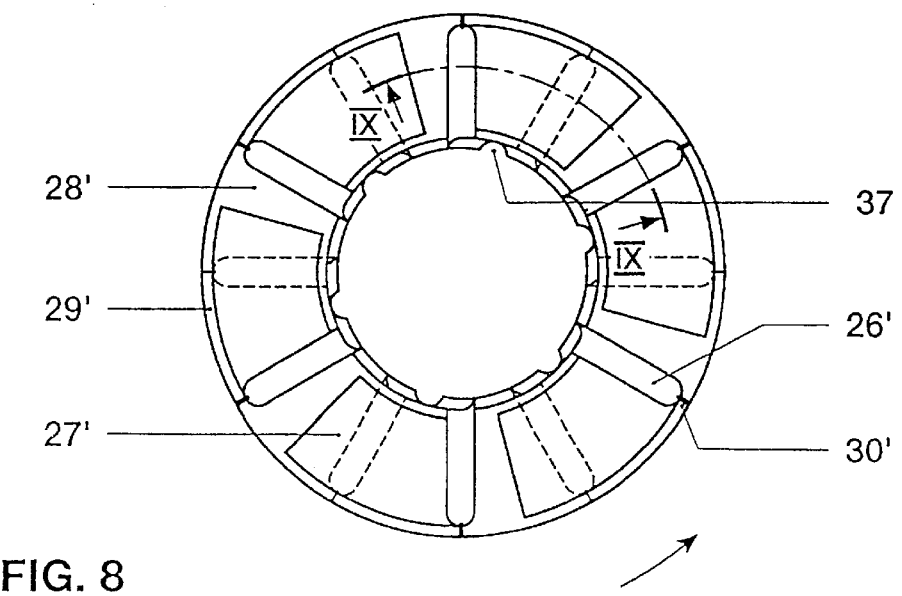
FIG. 8 shows a section through the floating disk along the line VIII—VIII in FIG. 7.
Figure 7:
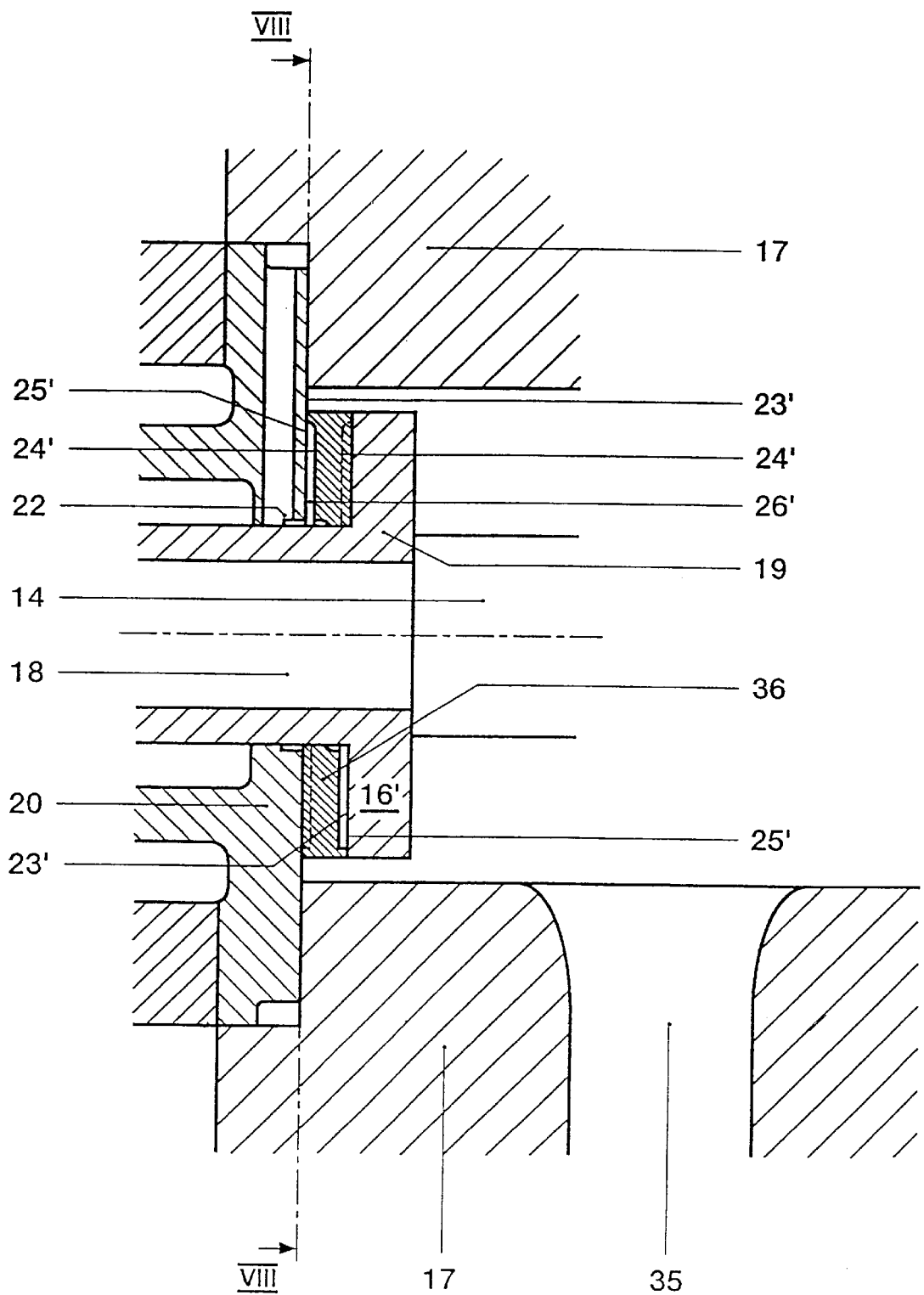
FIG. 7 shows an illustration similar to that of FIG. 2, but with the floating disk arranged between the bearing body and the bearing collar.

In a second exemplary embodiment, a floating disk 36 is arranged between the fixed bearing body 20 and the rotating bearing collar 19 (FIG. 7). Said floating disk possesses on both sides a profiled annular surface 24' which is designed in a similar way to the annular surface 24 of the bearing collar 19 in the first embodiment. Each annular surface 24' is accordingly composed of a plurality of radial lubricating oil grooves 26' with wedge surfaces 27' adjoining these in the circumferential direction and with plane catch surfaces 28'. The lubricating oil grooves 26' and the wedge surfaces 27' are delimited radially outward by a sealing web 29', the latter having dirt grooves 30' designed in a similar way to the first exemplary embodiment. The lubricating oil grooves 26' of the two annular surfaces 24' are connected to one another by way of oblique recesses 37 inside the floating disk 36 (FIG. 8, FIG. 9). Both the bearing collar 19 and the bearing body 20 are equipped with a plane sliding surface 23' on their side facing the floating disk 36 (FIG. 7). The further design of the axial sliding bearing 16' is essentially identical to that of the first exemplary embodiment.

In this design of the axial sliding bearing 16', a lubricating gap 25' is formed on each of the two sides of the floating disk 36. The first lubricating gap 25' is arranged between the plane sliding surface 23' of the bearing body 20 and that profiled annular surface 24' of the floating disk 36 which faces said sliding surface and the second lubricating gap 25' is arranged between the plane sliding surface 23' of the bearing collar 19 and that profiled annular surface 24' of the floating disk 36 which faces said sliding surface. In this case, the dirt particles in the lubricating oil 3 are separated and thrown out essentially in the same way as in the first exemplary embodiment. In contrast to this, the profiled annular surfaces 24' of the floating disk 36 do not rotate with the shaft 14, but about the latter, although this does not impair the purifying effect of the dirt grooves 30'. Since the relative speed in the lubricating gaps 25' as a result of the rotation of the floating disk 36 is reduced to about half the rotational speed of the shaft 14, the wear behavior of the axial sliding bearing 16' and, in particular, of its wedge surfaces 27' and catch surfaces 28' can be markedly improved.

An optimum loadbearing force of the axial sliding bearing 16, 16' is achieved, in both exemplary embodiments, when the extent of the catch surfaces 28, 28' amounts to approximately ¼ of the extent of the wedge surfaces 27, 27' of the bearing (FIG. 3, FIG. 8).

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An axial sliding bearing for mounting the shaft (14) of an exhaust gas turbocharger (9) connected to an internal combustion engine (8) and supplied by way of the lubricating oil circuit (1) of the latter with lubricating oil (3) coarsely purified in a filter (6), said bearing being composed of a bearing body (20) connected fixedly to a bearing housing (17), of a bearing collar (19) rotating with the shaft (14) and of at least one lubricating gap (25, 25'), which is designed between the two and which is formed by a profiled annular surface (24, 24') and a plane sliding surface (23, 23') and is connected to an oil feed (21), wherein a) the profiled annular surface (24, 24') is designed to rotate about or with the shaft (14), has a plurality of radially arranged lubricating oil grooves (26, 26') and, in each case, a wedge surface (27, 27') connected to these in the circumferential direction, and a catch surface (28, 28') is designed between each wedge surface (27, 27') and the lubricating oil groove (26, 26') adjacent to the latter, b) the lubricating grooves (26, 26') and the wedge surfaces (27, 27') are delimited radially outward by a sealing web (29, 29'), c) the sealing web (29, 29') has, in the region of the lubricating oil grooves (26, 26'), dirt grooves (30, 30') open to these and to the outside.

2. The axial sliding bearing as claimed in claim 1, wherein a floating disk (36) known per se, with a profiled annular surface (24') on both sides, is arranged between the bearing collar (19) and the bearing body (20) and both the bearing collar (19) and the bearing body (20) are designed with a plane sliding surface (23').

3. The axial sliding bearing as claimed in claim 1, wherein the profiled annular surface (24) is arranged on the bearing collar (19) and the plane sliding surface (23) is arranged on the bearing body (20).

4. The axial sliding bearing as claimed in claim 2, wherein each wedge surface (27, 27') has an entry wedge depth (32) and each dirt groove (30, 30') has a depth (33) and the latter corresponds to 0.5 to 3 times the entry wedge depth (32).

5. The axial sliding bearing as claimed in claim 4, wherein the extent of the catch surfaces (28, 28') amounts to approximately ¼ of the extent of the wedge surfaces (27, 27') of the axial sliding bearing (16).

6. The axial sliding bearing as claimed in claim 5, wherein the filter (6) has a mesh width and the depth (33) of the dirt grooves (30, 30') corresponds at least to twice the mesh width.

7. The axial sliding bearing as claimed in claim 5, wherein the depth (33) of the dirt grooves (30, 30') is designed to be smaller than twice the entry wedge depth (32).

8. A method for operating an axial sliding bearing as claimed in claim 1, wherein larger dirt particles contained in the coarsely purified lubricating oil (3) are centrifuged out before they reach the lubricating gap (25, 25').

9. The method as claimed in claim 8, wherein the dirt particles are centrifuged out in the region of the lubricating oil grooves (26, 26').

\* \* \* \* \*